Feb. 9, 1954

C. F. PETKWITZ 2,668,423

REFRIGERATOR UTILITY DRAWER MOUNTING

Filed June 18, 1952

INVENTOR.
Carl F. Petkwitz
BY

Willits, Hardman & Fehr.

Feb. 9, 1954     C. F. PETKWITZ     2,668,423
REFRIGERATOR UTILITY DRAWER MOUNTING
Filed June 18, 1952     2 Sheets-Sheet 2
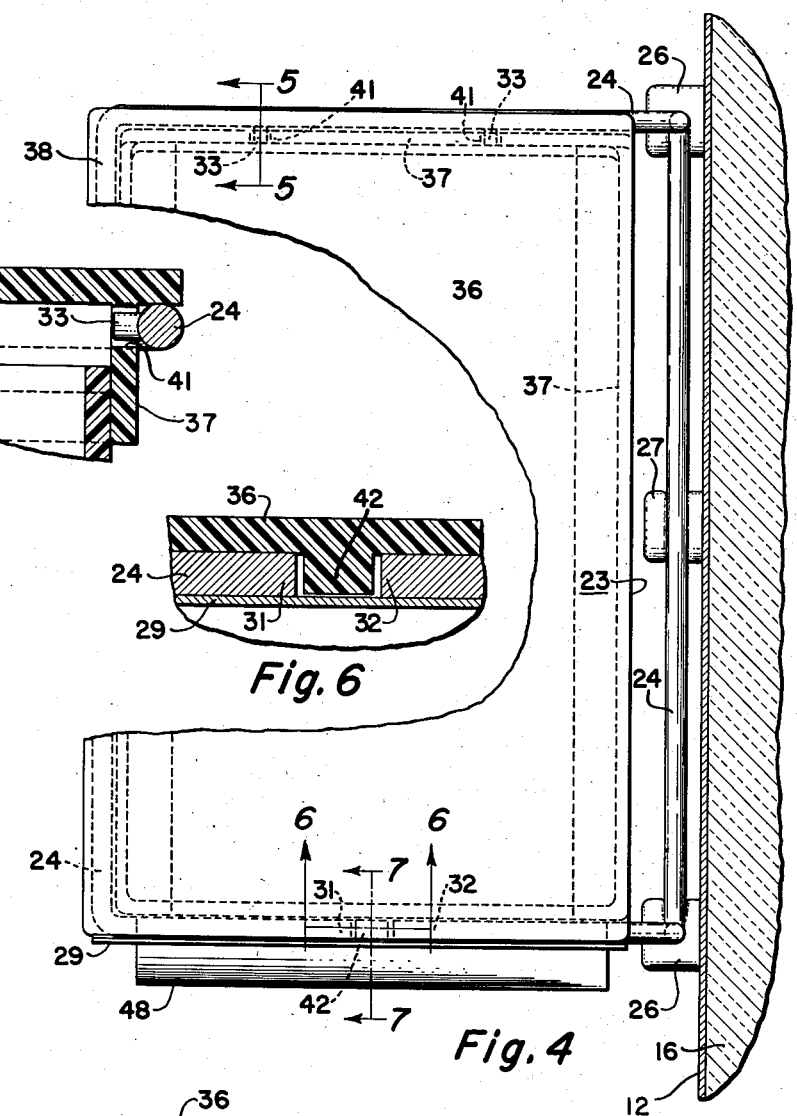
INVENTOR.
Carl F. Petkwitz
BY
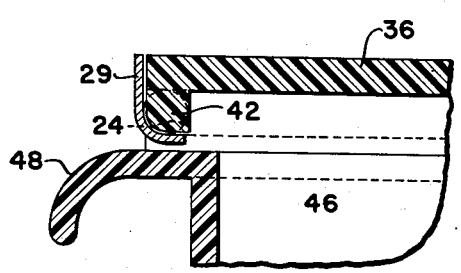

Patented Feb. 9, 1954

2,668,423

UNITED STATES PATENT OFFICE 2,668,423

REFRIGERATOR UTILITY DRAWER MOUNTING

Carl F. Petkwitz, Oakwood, Ohio, assignor to General Motors Corporation, Dayton, Ohio, a corporation of Delaware Application June 18, 1952, Serial No. 294,151

1 Claim. (Cl. 62—116)

This invention relates to refrigeration and particularly to a refrigerator cabinet having novel food storage arrangements therein.

In producing mechanical household refrigerators it is an ever increasing problem to provide a cabinet in which food products of various types, shapes and sizes relative to one another may have a proper place of storage therein without materially increasing the size of the food compartment in a cabinet and without unduly sacrificing a part of the storage area or shelf supporting surface within a compartment of predetermined size. With this problem in mind the following objects and advantages of the present invention will become apparent.

An object of my invention is to provide an improved food storage arrangement in a refrigerated food compartment of a refrigerator cabinet and a novel container device therein which forms a cheese storage chest for keeping cheeses in a soft palatable condition over long periods of time.

Another object of my invention is to provide a novel covered food storage receptacle device and article supporting shelf arrangement within a refrigerated compartment of a household refrigerator cabinet so as to permit the storage within the compartment of different types of foods and variously shaped or sized articles without materially reducing or impairing the total storage capacity of the compartment.

A further object of my invention is to space shelf or the like elements in vertical relation to one another in a food compartment of a refrigerator to define a storage area within the compartment of predetermined size adapted to receive and store tall articles such as bottles of milk and bottled beverages in an upright position therein and to divide a portion of the tall predetermined sized storage area into a plurality of smaller areas for receiving and storing relatively short in height articles by a covered utility or cheese storage receptacle device whereby the shelf supporting area within the cabinet is increased.

It is a more specific object of my invention to slideably suspend the cheese storage or utility receptacle device described in the foregoing objects from a cover therefore which is secured to a horizontal part of an inverted substantially L-shaped mounting frame having its vertical portion attached to an upright side wall of a food compartment of a refrigerator cabinet whereby the weight of articles supported upon its cover is prevented from being transmitted to a shelf within the food storage compartment of the cabinet.

Further objects and advantages of the present invention will be apparent from the following description, reference being had to the accompanying drawings, wherein a preferred form of the present invention is clearly shown.

In the drawings:

Figure 4 is a fragmentary top view of the covered receptacle device and is taken on the line 4—4 of Figure 3;

Figure 5 is an enlarged sectional view taken on the line 5—5 of Figure 4 showing a means on the supporting frame for locking the cover of the receptacle device thereto;

Figure 6 is a detailed sectional view taken on the line 6—6 of Figure 4 showing a boss on the cover of the receptacle device fitted in a space between ends of the supporting frame; and Figure 7 is a detailed sectional view taken on the line 7—7 of Figure 4 showing the cover of the receptacle device fitted behind a front angle iron on the supporting frame.

Figure 1:
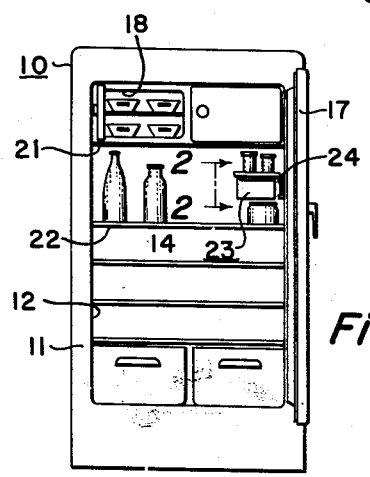
Figure 1 is a front view of a household refrigerator cabinet having my invention embodied therein and showing the food storage compartment door thereof in open position.

Referring to the drawings, for illustrating my invention, I show in Figure 1 thereof a household refrigerator cabinet 10 having a metal outer shell or panels 11 and a metallic liner 12 spaced therefrom, in the conventional manner, to form a plurality of walls including upright side walls of a food storage compartment 14 within cabinet 10. Any suitable or desirable insulating material 16 (see Figures 3 and 4) is placed in the space between the cabinet outer walls 11 and liner 12. Food storage compartment 14 is provided with the usual access opening which is normally closed by a door 17, shown in open position. The outer walls 11 of cabinet 10 are extended downwardly beyond compartment 14 to provide a machine compartment in the lower portion of the cabinet. A closed refrigerating system is associated with cabinet 10 and includes a refrigerant translating apparatus such as a conventional motor-compressor-condenser unit (not shown) ordinarily mounted in the machine compartment of the cabinet. This refrigerating system also includes a cooling means or evaporator 18 located in the top portion of compartment 14 to form a freezing chamber therein for the reception of frozen foods or trays of water to be frozen. Evaporator 18 preferably extends entirely across compartment 14 and has doors providing access to the freezing chamber formed thereby. The remainder of the food storage compartment 14 is divided into a plurality of storage spaces by suitable partitions or baffles and food supporting shelves. The refrigerating effect produced by evaporator 18 of the refrigerating system cools and causes air in compartment 14 to circulate throughout the interior thereof as is well known in the art.

Figure 2:
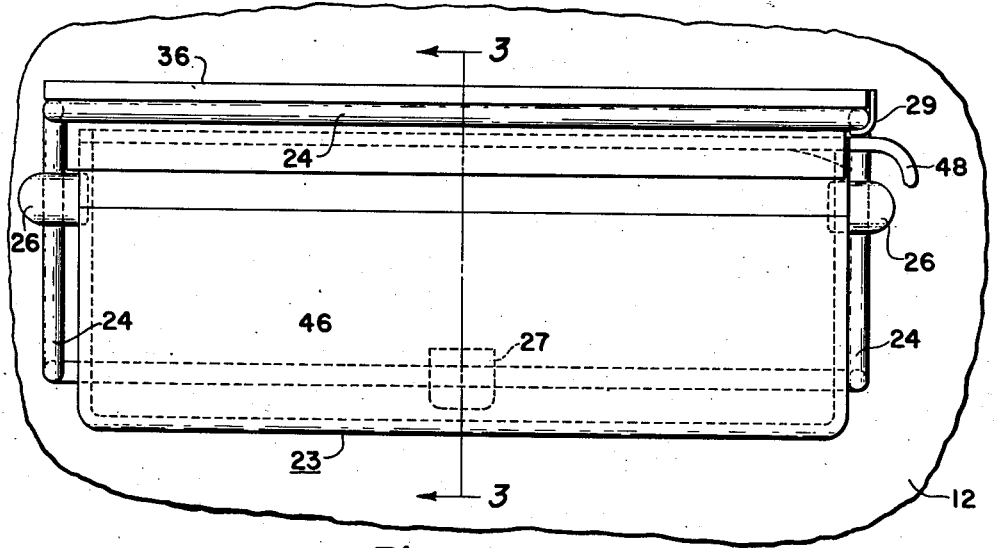
Figure 2 is an enlarged side view of a covered receptacle device within the food compartment supported from an upright side wall thereof and is taken on the line 2—2 of Figure 1.

In the present disclosure a horizontal drip pan or baffle element 21 is located under the evaporator 18 and a horizontal shelf element 22 is vertically spaced from the baffle element 21. These elements 21 and 22 extend substantially entirely across the interior of compartment 14 intermediate its upright side walls to define within the food storage compartment an area of predetermined size adapted to receive and store tall articles in an upright position (see Figure 1). For example, tall quart ginger ale or other bottled beverages as well as bottle milk may be supported on shelf 22 within the predetermined sized area formed in compartment 14 by the elements 21 and 22. According to my invention it is desirable to locate a covered utility receptacle device within compartment 14 in such manner as to relieve a food supporting shelf in the compartment of the weight of such a device and without destroying any of the food supporting shelf area therein. I therefore provide a device of this character within compartment 14 which is generally represented by the reference numeral 23 in Figure 1 of the drawings. A heavy metal wire or bar frame 24, which is formed into a rectangular shape and thereafter bent into a substantially L-shape, is inverted and positioned within compartment 14 in the predetermined sized area therein between the elements 21 and 22. Frame 24 forms means for supporting the covered receptacle device 23, within this area of predetermined size and is removably secured to liner 12 at one of the upright side walls of compartment 14. The wire or bar frame 24 has its vertical leg fitted in slots provided in horizontally spaced apart and aligned shelf or the like pegs 26 (see Figures 2 and 4) secured to liner 12 in any suitable or conventional manner (see Figure 3). One or more slotted shelf or the like pegs 27, located below pegs 26, receive the bottom horizontal part of the vertical leg of frame 24 to support the same from liner 12. The pegs 26 and 27 are arranged to prevent movement of frame 24 in all but a vertical direction. Thus frame 24 may be detached from the side wall of compartment 14 or from liner 12 by elevating the same relative to the pegs 26 and 27. The front side of the horidontal leg portion of wire bar frame 24 has an angle iron piece 29 welded thereto with its vertical portion extending upwardly above the frame 24 (see Figures 2, 4 and 7). Frame 24 is fabricated from a continuous wire or bar and it will be noted that its ends 31 and 32 are terminated in spaced relation to one another (see Figures 4 and 6) for a purpose to be hereinafter described. The angle iron piece 29 forms a trim strip and conceals the spaced apart ends 31 and 32 of frame 24 from view at the front of the device 23. The rear portion of frame 24 has a pair of horizontally spaced apart inwardly projecting studs 33 thereon (see Figures 3, 4 and 5) for a purpose to be hereinafter described.

Receptacle device 23 includes two cooperating component parts fabricated of any suitable material and preferably formed of clear or transparent molded plastic material. The one part of device 23 comprises a combined lid or cover supporting member 36 provided with a depending flange 37 extending along the back and sides thereof (see Figures 3, 4 and 5). Member 36 has an edge portion indicated at 38 (see Figures 3 and 4) projecting outwardly beyond the main cover portion along one side thereof which rests upon frame 24. The front and rear edge portions of cover member 36 also rest upon frame 24. In order to detachably lock member 36 of the device 23 to frame 24 I provide holes 41 in the flange 37 at the rear of member 36 into which the studs or pins 33 fit (see Figures 4 and 5). I also provide cover member 36 with an integral depending lug 42 at its front edge portion which lug is adapted to be located in the space between the ends 31 and 32 of the wire rod frame 24 (see Figures 4, 6 and 7). To locate cover member 36 in place upon the frame 24 its front edge is held above the angle iron 29 so as to position its back flanged edge forwardly of the studs or pins 33. Member 36 is held at an angle and then moved rearwardly to cause the pins 33 to be received in the holes 41 whereupon its front edge may be lowered upon frame 24 behind the angle iron piece 29 with the lug 42 being received in the space between the ends 31 and 32 of frame 24. Thus the combined article support and cover member 36 of device 23 is detachably interlocked with frame 24 and secured against movement in all directions relative thereto except that its front edge may be raised to slide the holes 41 forwardly to detach member 36 from the frame. That portion of flange 37 along the two long sides of member 36 has an integral inwardly directed ledge 44 thereon (see Figure 3) which serves to provide or form opposed tracks for slideably receiving a drawer or receptacle part of device 23.

Figure 3:
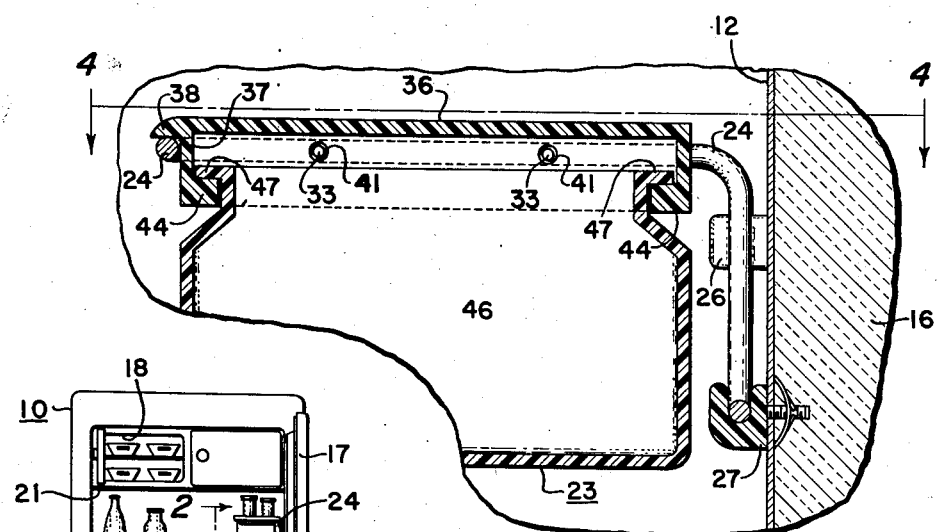
Figure 3 is a fragmentary vertical sectional view of the covered receptacle device taken on the line 3—3 of Figure 2.

An open top drawer or receptacle 46, preferably also formed of clear or transparent molded plastic material, forms a part of the utility device 23 and has its top edge along the sides thereof flanged outwardly as at 47 (see Figure 3). The flanges 47 rest on the opposed tracks 44 of the lid or cover part 36 of device 23 to slideably suspend the receptacle 46 therefrom. The flange 37 along the rear edge of cover member 36 is adapted to be engaged by receptacle 46 and therefore this portion of flange 37 provides a stop for the rearward sliding movement of the receptacle on its tracks. An integral finger grip or handle 48 is provided at the front of receptacle 46 to facilitate sliding movement of the receptacle relative to its cover. It will be noted that the frame 24 supports device 23 in spaced relation to the side wall of compartment 14 to thereby permit air, cooled and caused to circulate by the evaporator 18, to flow therebetween. It will also be noted that the cover member 36 of device 23 is spaced from the uppermost element 21 and that the bottom of receptacle 46 of device 23 is spaced from the lowermost element 22. Thus cold air circulates entirely around the covered receptacle device 23. By spacing the device 23 as shown in Figure 1 of the drawings it divides a portion of the area of predetermined size, formed between the elements 21 and 22, adjacent the one side wall of food storage compartment 14 into a plurality of smaller storage areas one above and the other below the covered receptacle device. Thus the top of cover member 36 provides additional food supporting shelf surfaces within compartment 14 since articles which are short in height such as jelly jars or glasses, etc., may be supported thereon in the smaller area above the covered receptacle device 23. Small articles such as short-in-height fruit jars and the like may be supported on the shelf element 22 immediately below the covered receptacle device in the other of the smaller storage areas.

The covered receptacle device may be entirely closed or it may be vented as desired. However device 23 serves as a utility drawer or receptacle for isolating certain food products from air circulating within the food storage compartment 14. In this respect utility drawer or receptacle 46 of device 23 forms an ideal place of storage for some wrapped food products, particularly cheeses and the like. Experiments have shown that cheese, after having its original sealing wrapper once opened is very seldom again resealed properly, placed in the main food storage compartment of a refrigerator soon becomes dried out and turns hard. Such hard, dried-out cheese is usually thrown away and wasted because it is not edible in its original state and is usable only when melted and cooked with other foods such, for example, as macaroni, spaghetti and vermicelli. Cheese placed in the receptacle drawer 46 of the present covered device 23 is kept soft and edible in its original state or condition over long periods of time.

From the foregoing it should be apparent that I have provided an improved food storage arrangement in a food compartment of a refrigerator. My covered receptacle or utility drawer device occupies a very small portion of the food storage compartment and increases the food supporting shelf surfaces therein. It also serves as a location for the storage of certain food products and therefore forms an ideal cheese storage chest in the refrigerator. By supporting the covered receptacle device solely from a side wall of the food compartment the weight of its contents and that of contents placed on top of the same is not transmitted to a shelf within the compartment, which shelf would otherwise have to be made much heavier and stronger than is ordinarily required. The various component parts of the covered receptacle device and its supporting frame may be readily dismantled and removed for cleaning the interior thereof.

While the form of embodiment of the invention as herein disclosed constitutes a preferred form, it is to be understood that other forms might be adopted, as may come within the scope of the claim which follows.

What is claimed is as follows:

In a refrigerator, a cabinet, said cabinet having a compartment therein, a closed refrigerating system associated with said cabinet, said system including a refrigerant translating unit and a refrigerant evaporator for cooling the interior of said compartment, vertically spaced apart elements extending continuously across said compartment to define therebetween an area of predetermined height adapted to receive and store tall articles in an upright position, a covered receptacle device in said compartment, means independent of said elements for mounting said device within said area of predetermined height, said mounting means positioning the bottom of said receptacle device in spaced relation above the lowermost of said vertically spaced apart elements to form within said area of predetermined height a first smaller food storage area, said lowermost element providing a support for receiving and storing relatively short in height articles within said first smaller food storage area beneath said device, said mounting means positioning the cover of the receptacle of said device in spaced relation below the uppermost of said vertically spaced apart elements to form a second smaller food storage area within said area of predetermined height, said cover of said receptacle providing a support for receiving and storing relatively short in height articles thereon within said second smaller food storage area above said device and below said uppermost element, and said independent mounting means preventing the weight of contents of said receptacle device and the weight of articles supported on the cover thereof from being transmitted to either of said elements.

CARL F. PETKWITZ.

References Cited in the file of this patent

UNITED STATES PATENTS

| Number | Name | Date |
|---|---|---|
| 397,984 | Hess et al. | Feb. 19, 1889 |
| 2,065,116 | Constantine et al. | Dec. 22, 1936 |